United States Patent [19]
Gorchev

[11] 3,799,046
[45] Mar. 26, 1974

[54] DIFFUSER VALVE

[76] Inventor: Dimiter Gorchev, c/o Mitco Corporation, 440 Somerville Ave., Somerville, Mass. 02143

[22] Filed: Apr. 6, 1972

[21] Appl. No.: 241,805

Related U.S. Application Data

[63] Continuation of Ser. No. 53,921, July 10, 1970, abandoned.

[52] U.S. Cl. .............. 98/41 AV, 98/41 R, 98/40 D
[51] Int. Cl............................................. F24f 13/06
[58] Field of Search.................... 251/205, 155, 154; 98/41 R, 41 AV, 40 D, 40 B; 137/801

[56] References Cited
UNITED STATES PATENTS

| | | | |
|---|---|---|---|
| 1,504,787 | 8/1924 | Richter | 251/205 X |
| 2,252,264 | 8/1941 | Kurth | 98/40 B |
| 3,299,797 | 1/1967 | Dry | 98/41 X |
| 515,491 | 2/1894 | Hanford | 137/801 X |
| 1,921,457 | 8/1933 | Dickinson | 98/41 AV |
| 2,367,104 | 1/1945 | Demuth | 98/41 AV |
| 3,363,536 | 1/1968 | Dean, Jr. | 98/41 |
| 2,775,927 | 1/1957 | Wulle | 98/40 D |

*Primary Examiner*—Arnold Rosenthal
*Attorney, Agent, or Firm*—Robert F. O'Connell; Dike, Bronstein, Roberts & Cushman

[57] ABSTRACT

A valve for adjusting flow of heated or cooled air, through a supply duct, characterized by a substantially linear relationship between rate of flow through the valve and the position of a linearly movable impedance member in the valve. The valve comprises an orifice plate, generally circular or rectangular, secured in the duct and having an outer perimeter matching the duct wall and an inner perimeter defining an orifice through which fluid can flow. An impedance member is mounted for linear movement into the orifice, and has a convex tapered outer surface facing the inner perimeter of the orifice plate. The convex tapered outer surface of the impedance member is provided with a shape, for example circular or parabolic in cross section, such that flow through the orifice between the inner perimeter and the convex surface varies substantially linearly with changes in position of the impedance member. In one embodiment, the orifice is circular and the impedance member has a hemispherical or paraboloid surface. The orifice plate carries a mounting bridge which threadably engages a shaft secured to the impedance member. Flow adjustment is accomplished by rotating the orifice to change the amount of flow. In another embodiment, the orifice is oblong and the impedance member has convex surfaces facing the long sides of the oblong and flat mating surfaces on the short sides of the oblong so that all flow is controlled by the convex surfaces. The impedance member is mounted slidably on fixed guides secured to the orifice plate. Adjustment is accomplished by means of a threaded shaft rotatably carried by the impedance means and threadably engaging a member in fixed relation to the orifice plate. Rotation of the threaded shaft moves it and the impedance member into or out of the orifice.

13 Claims, 4 Drawing Figures

DIFFUSER VALVE

This is a continuation, of application Ser. No. 53,921, filed on July 10, 1970 now abandoned.

BACKGROUND OF THE INVENTION

The field of this invention relates to flow adjustment devices, especially valves for adjusting flow through heating or air conditioning ducts used to supply a building, for example, and more particularly valves used to balance such a system at the point where the air supply is fed into a diffuser.

Balancing of heating and air conditioning systems has heretofore been accomplished by means of blade-type dampers, which are pivotally mounted in a diffuser and rotated to vary the amount of flow therethrough. These dampers have very poor control characteristics because virtually all regulation takes place in approximately 20° of rotation. The control is irregular as well, and a particular angular setting cannot be relied upon to provide a predetermined flow. In order to balance a system using blade dampers, one must measure the flow delivered by a diffuser by a time consuming traverse with a measuring instrument, calculating average velocity to obtain the flow rate. If the flow rate is not as desired, the damper is rotated and the procedure is done once again. Obviously both skill and patience are called for, and the process is expensive. Further distractions of blade dampers are that they adversely effect even air distribution, are noisy, accumulate dirt, and tend to vary characteristics with age. Finally, they call for preconstruction and cannot be easily inserted in a system after installation as a complete unit.

SUMMARY OF THE INVENTION

Objects of the present invention are to provide a valve for regulating flow of fluid, for example temperature conditioned air, through a supply duct, which can be predictably and accurately set for a predetermined flow rate, which permits adjustment by means of a simple change of position, which provides good distribution, which is quiet, and which is stable in adjustment with time and compatible with a wide variety of diffusers.

According to the invention, the valve for regulating flow through a duct comprises an orifice plate secured in said duct and having an outer perimeter disposed to close passage through said duct and an inner perimeter defining an orifice through which said fluid can flow. Movable linearly in said orifice is an impedance member having a convex tapered outer surface facing and conforming in shape to at least a portion of said inner perimeter, said surface being shaped so that flow through the orifice between said inner perimeter and said surface vary substantially linearly with linear changes in position of said impedance member. The impedance member is movable between a first position of greatest separation from said inner perimeter for maximum flow and a second position of least separation from said inner perimeter for minimum flow, and means are provided for mounting said impedance member for linear motion between said two positions.

In one highly practical embodiment of the invention, the orifice is circular and the surface of the impedance member is a surface of revolution about the orifice axis, for example a hemisphere or a paraboloid of revolution. A threaded shaft is mounted axially on the impedance member and the shaft threadably engages a mount fixed to the orifice plate. Rotation of the shaft moves the impedance member axially to adjust flow.

In another highly practical embodiment, the orifice is rectangular and the impedance member has two convex surfaces facing opposite sides of the rectangle and two flat surfaces mating with the other sides of the rectangle, flow through the orifice thus being along the two convex surfaces. The impedance member is slidably mounted on guides attached to the orifice plate, and an adjusting screw is rotatably attached to the impedance member and threadably attached to a fixed member so that rotation of the shaft causes it to move axially and to carry the impedance member axially along with it.

These and other objects and novel aspects of the invention will be apparent from the following description of preferred embodiments.

DESCRIPTION OF THE PREFERRED EMBODIMENTS

Figure 1:
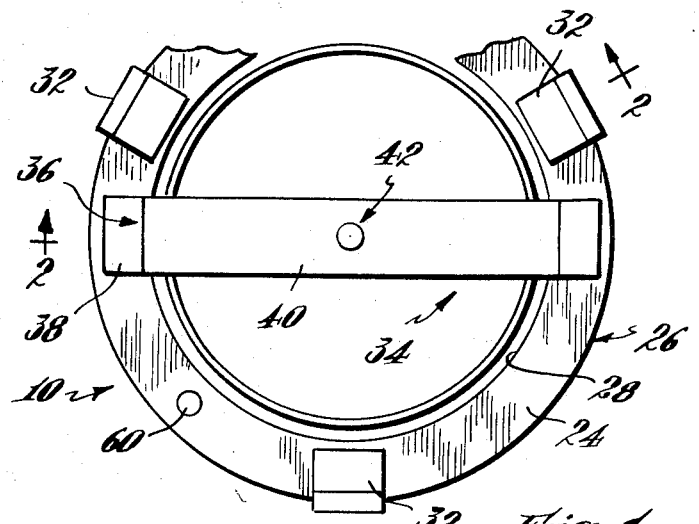
FIG. 1 is a plan view of a diffuser valve according to the invention adapted for insertion into a cylindrical duct.
Figure 2:
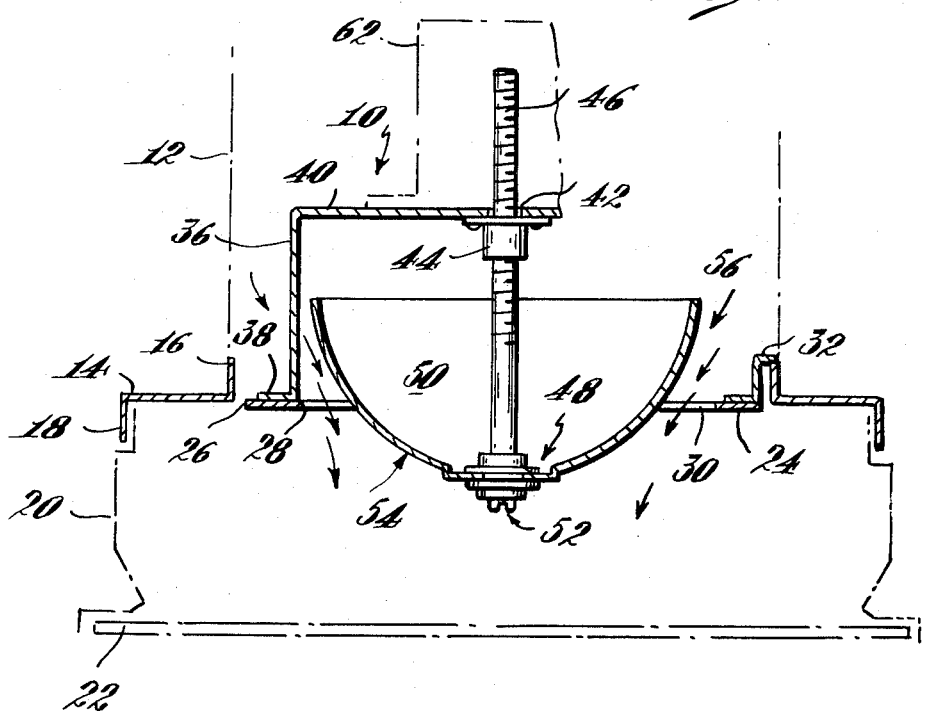
FIG. 2 is a section on line 2—2 of FIG. 1.

Illustrated in FIGS. 1 and 2 is a diffuser valve 10 constructed according to the invention and designed for snap-in insertion at the diffuser terminus of a cylindrical supply duct 12. In typical fashion, a diffuser cap 14 has a flange 16 fitting within the duct 12 and a flange 18 to which a diffuser unit 20 is attached. Conditioned air, either heated or cooled, is fed through supply duct 12 to diffuser unit 20, the rate of flow to be determined by diffuser valve 10. The air passes from diffuser 20 to its destination, e.g., a room, through grille 22.

Diffuser valve 10 comprises an annular orifice plate 24 whose outer perimeter 26 follows the shape of duct 12 to form a reasonably good seal therewith, and whose inner perimeter 28 defines a circular orifice 30. Stamped or cut sheet metal forms a suitable material for orifice plate 24.

The diffuser valve 10 is secured within the duct 12 by means of three circumferentially spaced spring clips 32, attached to the orifice plate 24 typically by welding. The clips 32 bend inwardly during insertion of the vlave into the duct, and then spring outwardly to rest against the upper edge of diffuser cap flange 16.

An impedance member 50 is mounted for linear movement into the orifice 30 by means of a mounting bridge 34 straddling orifice 30 and having upstanding legs 36 terminating in feet 38 which are secured to orifice plate 24 typically by welding. The spanning portion 40 of the bridge 34 has aperture 42 and a threaded receptacle 44 secured thereto with rivets, for example, to act as a mount for a threaded adjustment shaft 46 extending along the axis of the circular orifice 30. Secured by lock nuts 48 to the lower end of shaft 46 for rotation therewith is the impedance member 50. A screwdriver slot 52 is provided in the bottom end of shaft 46, where it is accessible within diffuser 20 to a person desiring to balance the system by adjusting valve 10. By rotating shaft 46 with a screwdriver, impedance member 50 moves linearly along the axis of the circular orifice 30 and changes the rate of flow through the valve in an even and regular manner as more fully explained below.

As shown in FIG. 2, the outer surface 54 of impedance member 50 extends into orifice 30 and is provided with a convex taper facing the inner perimeter 26 of the orifice plate 24. Flow of air through the valve 10 thus takes the path shown by the flow arrows in FIG. 2, through an annular channel 56 formed by the impedance member outer surface 54 and the orifice plate inner perimeter 26.

By giving the impedance member outer surface 54 a convex taper as shown in FIG. 2, the changes in flow rates through the valve 10 approach a linear relationship with changes in the linear position of the impedance member. It has been found that a close approach to linearity is obtained when the impedance member outer surface 54 has approximately the shape of a hemisphere or a paraboloid, with empirically derived variations of these shapes giving as much linearity as desired, both such surfaces of revolution being coaxial with the axis of orifice 30. These shapes provide a substantial range of adjustment over which the desired linear relationship can be obtained. Deviations from strict linearity can be tolerated, however, because the convex tapered surface tends to make flow changes less sensitive to changes in position, thus eliminating the great positional sensitivity found in blade dampers.

As a consequence, a diffuser valve 10 such as that illustrated in FIGS. 1 and 2 can have its flow rate predicted and calibrated with reasonable accuracy before it is placed in the system, and is not subject to substantial flow variations with minor manufacturing variations and ageing effects. Because of the predictability of valves of this type, flow through them can be quickly adjusted to a desired level by employing standardized data or graphs relating duct pressure, flow, and impedance member position. For example, if it were desired to balance a number of different diffuser valves 10 to a uniform flow of twenty cubic feet per minute, each valve's supply duct 12 having a different pressure, adjustments would be carried out by (1) using a pressure gauge to measure pressure in each duct 12, (2) referring to standard data to determine the correct position of the impedance member 50 to produce 20 cubic feet per minute at that pressure, and (3) moving impedance member 50 to the indicated position by rotating shaft 46 with a screwdriver placed in slot 52. Pressure measurement can be easily accomplished with diffuser valve 10 in place by providing an aperture 60 in the orifice plate 24 through which a pressure instrument's probe can extend.

The impedance member 50 illustrated in FIG. 2 can be made by stamping or spinning a sheet of metal to the desired shape. Alternatively, it can be molded or cast either as a shell or in solid form from plastic or metals having properties suitable for use in a heating or air conditioning system. Adjustment of impedance member 50 can, if desired, be accomplished by motor means, shown schematically as 62, adapted to turn threaded shaft 46 or to pneumatically extend a smooth shaft provided alternatively. The control for a motor 62 would typically be provided by standard electrical or pneumatic control mechanisms.

Figure 3:
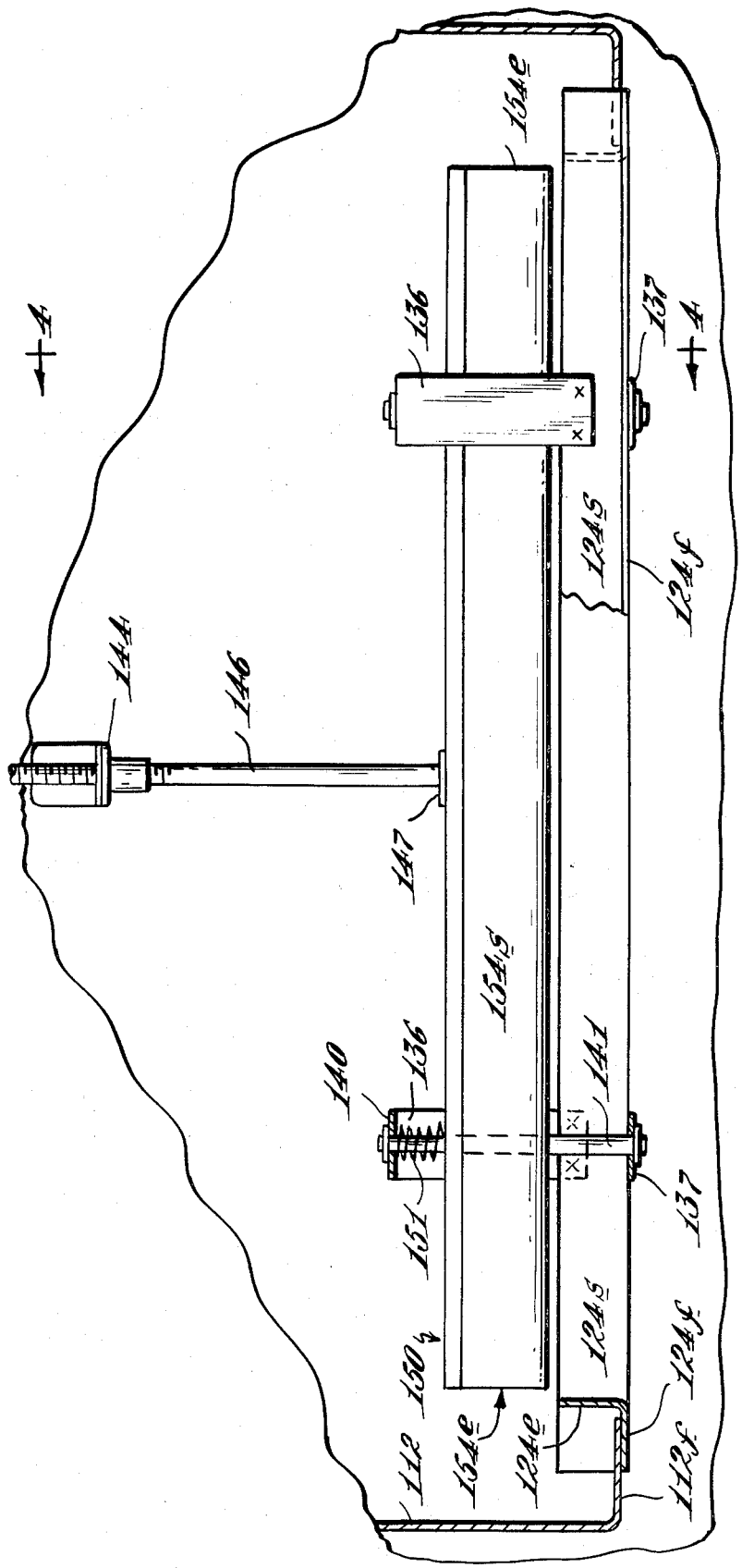
FIG. 3 is a side view, partially in section, of another embodiment of the invention.
Figure 4:
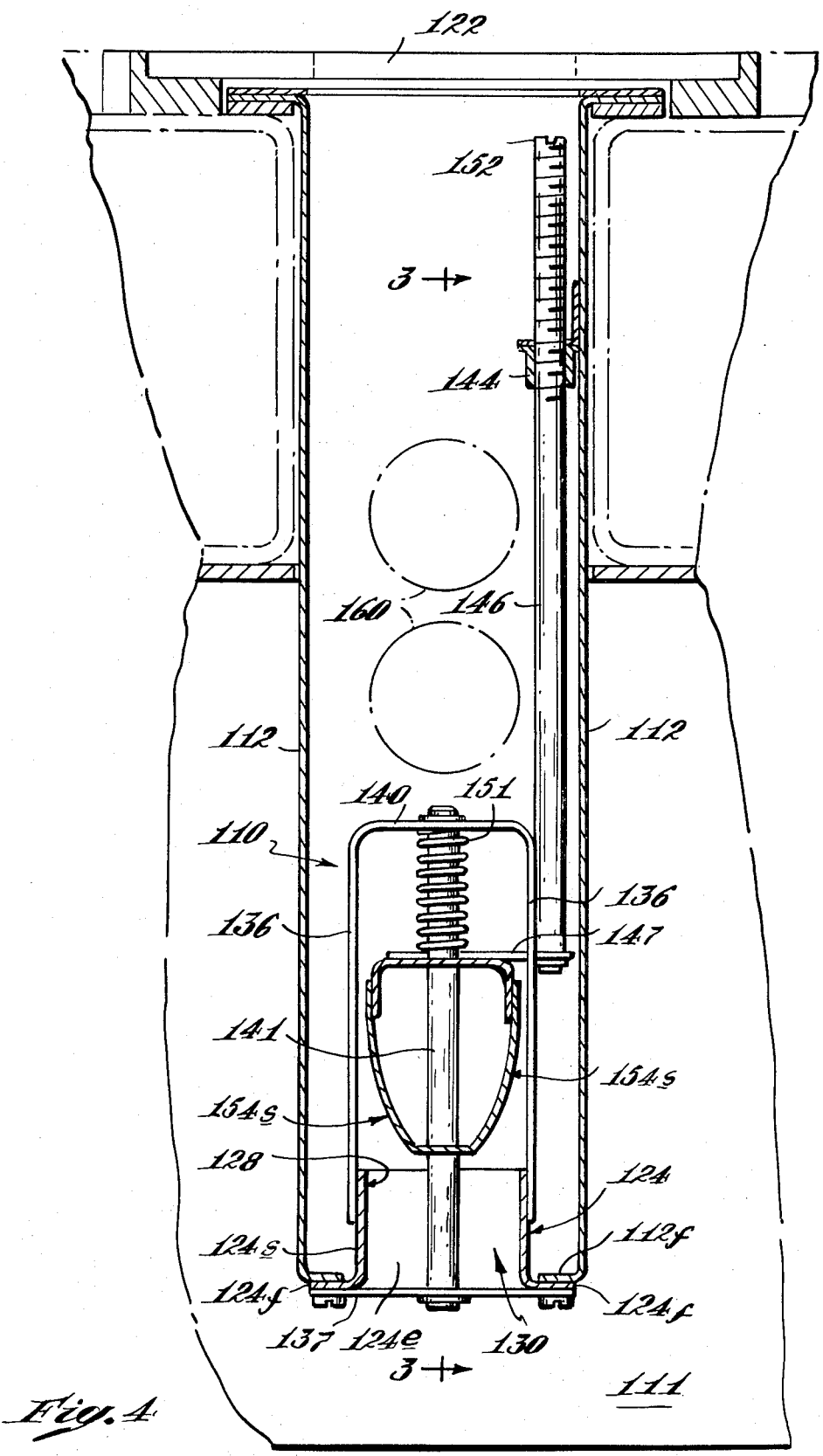
FIG. 4 is a section on line 4—4 of FIG. 3.

FIGS. 3 and 4 illustrate another diffuser valve 110 constructed according to the invention and designed for use with a floor duct system supplying conditioned air from a plenum 111. A rectangular duct 112, formed for example of sheet metal, feeds air from the plenum 111, through the valve 110, and upwardly through a floor grille 122 to its destination, e.g., a room.

Diffuser valve 110 differs from the circular diffuser valve 10 described above by having a generally oblong shape. The diffuser valve 110 comprises a generally oblong orifice plate assembly 124 constructed of upstanding wall portions with two long side portions 124s joining two shorter end portions 124e. Both side portions 124s and end portions 124e are provided with outwardly extending flanges 124f which facilitate attachment of the valve 110 to complementary inturned flanges 112f provided at the input end of duct 112, the orifice plate assembly 124 thereby following the shape of duct 112 to form a reasonably good seal therewith. The side and end portions 124s and 124e of the orifice plate assembly 124 form its inner perimeter 128 which defines an oblong orifice 130.

Mounted for linear movement into the oblong orifice 130 is an impedance member 150 which has flat outer end surfaces 154e (FIG. 3) which substantially mate with the orifice end portions 124e, and which has convex tapered side outer surfaces 154s facing the side portions 124s of the orifice plate assembly 124. Flow of air through the diffuser valve 110 therefore takes place in the two oblong channels which lie between the convex tapered impedance member side surfaces 154s and the orifice plate assembly side portions 124 s. As with the embodiment described earlier the convex tapered surfaces tend to provide a flow rate which changes linearly with changes of position of the impedance member 150. The side surfaces 154s produce a good approach to linearity when they have a circular or parabolic cross-section in regions adjacent the side portions 124s, and empirically developed deviations from these basic shapes can be made linear to the extent desired. Naturally, in many instances, deviations from linearity can be tolerated without difficulty, and the convex tapered outer side surfaces 154s provide flow characteristics which change sufficiently slowly with changes of position of impedance member 150 so that predictable behavior can be obtained from the valves 110 for ease of adjustment to desired flow rates.

The impedance member 150 is mounted for adjustable positioning in orifice 130 by means of a pair of spaced mounts each comprising a mounting bridge 134 straddling orifice 130 and having upstanding legs 136 secured, as by welding, to the orifice plate side portions 124s. Attached to the orifice plate assembly 124, opposite the mounting bridge 136, is a mounting plate 137, and secured between mounting plate 137 and the spanning portion 140 of mounting bridge 136 is a smooth guide rod 141 slidably connected to impedance member 150 by means of apertures provided therein. The position of impedance member 150 on the guide rods 141 is determined by a threaded adjustment shaft 146 which is rotatably connected to a bracket 147 secured to impedance member 150 and which is threadably connected to a threaded receptacle or bracket 144 secured to duct 112. The threaded shaft 146 is provided with a screwdriver slot 152 at the end nearest grille 122 so that adjustments are easily made with the valve in place. As the mounting and adjusting means for impedance member 150 may have some play in it, it is at times advisable to bias the impedance member by means of a spring 151 fitting over guide rods 141 between bridge portion 140 and impedance member 150 to avoid backlash and rattling.

Adjustment of flow through valve 110 is easily accomplished by measuring pressure in the plenum 111 and by positioning impedance member 150 to the position offering the desired flow according to specification sheets and without the need to conduct time-consuming velocity measurements. As FIG. 4 shows, the valve need not be located immediately adjacent an opening, but can be made accessible by means of the threaded adjustment shaft 146 at a fairly remote distance. This permits such accessories as electric reheat coils, shown schematically at 160 in FIG. 4, to be placed between the valve 110 and the outlet grille 122 without interfering with valve adjustment.

It should be understood that the present disclosure is for the purpose of illustration and that the invention includes all modifications falling within the scope of the appended claims.

I claim:

1. A device for regulating flow of air from a duct, said air flowing under pressure through an air passage of said duct, said device comprising
   a. a diffuser unit adaptable for attachment to said duct;
   b. orifice plate means secured within said duct at a position remote from the exit end of said diffuser unit and having an outer perimeter closing passage through said duct and an inner perimeter defining an orifice through which said air can flow;
   c. an impedance member movable substantially linearly within said duct into said orifice between a first position of greatest separation from said inner perimeter for maximum flow, and a second position of least separation from said inner perimeter for minimum flow, said impedance member having a convex tapered outer surface generally facing away from said duct conforming to at least a portion of said inner perimeter and an open concave inner surface generally facing toward said duct which inner surface is subject to contact with air flowing in said duct, said outer surface being shaped so that flow through said orifice between said inner perimeter and said outer surface varies in a substantially even and regular manner with linear change of position of said impedance member over the range thereof from said first position to said second position to provide a predictable rate of flow of said air through said orifice; and
   d. means adjustably mounting said impedance member for said substantially linear motion in said orifice.

2. A valve according to claim 1 wherein
said inner perimeter forms a circular orifice;
said impedance member has an outer surface which is a surface of revolution about the orifice axis,
the plane of said orifice plate means is substantially perpendicular to the direction of said movement; and
said convex tapered outer surface is generally angularly disposed with respect to the plane of said plate means during movement of said impedance member between said first and second position, the portion of said tapered outer surface which is adjacent said inner perimeter in said second position being angularly disposed to the plane of said plate means when said impedance member is in said second position.

3. A valve according to claim 2 wherein said orifice plate means is an annular plate and fits within a cylindrical duct, and further comprises attachment means mounted thereon to secure said plate in said duct.

4. A valve according to claim 2 wherein said mounting means comprises a threaded shaft secured to said impedance member and coaxial therewith, and means in fixed relation to said orifice plate means for threadably engaging said shaft, whereby rotation of said shaft causes said impedance member to rotate and to move substantially linearly in said orifice.

5. A valve according to claim 4 wherein said engaging means comprises a U-shaped bridge with its ends secured to said orifice plate means and having an aperture in its center portion to receive said shaft.

6. A valve according to claim 2 wherein said impedance member outer surface is substantially hemispherical.

7. A valve according to claim 2 wherein said impedance member outer surface is substantially a paraboloid of revolution.

8. A valve according to claim 1 further comprising motor means for moving said impedance member.

9. A valve according to claim 1 wherein said inner perimeter defines a polygonal orifice, and wherein said impedance member outer surface has convex tapered portions paralleling at least one side of said polygon.

10. A valve according to claim 9 wherein said inner perimeter defines a rectangular orifice and wherein said impedance member outer surface has two convex tapered portions facing opposite sides of said rectangle and two straight portions mating with the other sides of the rectangle, whereby all flow is between said convex tapered portions and said facing sides of said inner perimeter.

11. A valve according to claim 10 wherein said rectangle is oblong and said convex tapered portions face the longer sides.

12. A valve according to claim 9 wherein said mounting means comprises:
a linear guide;
means mounting said guide along the direction of motion of said impedance means;
said impedance means being attached for sliding motion along said guide.

13. A valve according to claim 12 further comprising:

a threaded shaft;
means rotatably connecting said shaft to said impedance member in fixed axial relation; and
means in fixed relation to said orifice plate for threadably engaging said shaft, whereby rotation of said shaft causes it to move axially and to move said impedance member in said orifice.

* * * * *